US006271809B1

(12) United States Patent
Kim

(10) Patent No.: US 6,271,809 B1
(45) Date of Patent: Aug. 7, 2001

(54) FLAT PANEL DISPLAY APPARATUS AND METHOD FOR INTERFACING DATA THEREOF

(75) Inventor: Se-Yong Kim, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/069,835

(22) Filed: Apr. 30, 1998

(30) Foreign Application Priority Data

Apr. 30, 1997 (KR) .................................................. 97-16656

(51) Int. Cl.[7] ...................................................... G09G 3/28
(52) U.S. Cl. ............................. 345/60; 345/72; 345/103; 345/152; 345/67
(58) Field of Search ............................... 345/103, 72, 67, 345/88, 151, 152, 60, 98

(56) References Cited

U.S. PATENT DOCUMENTS

| 4,044,349 | * | 8/1977 | Ohi et al. ................................. 345/98 |
| 5,387,923 | * | 2/1995 | Mattison et al. ....................... 345/103 |
| 5,748,165 | * | 5/1998 | Kubota et al. .......................... 345/96 |
| 5,847,688 | * | 12/1998 | Ohi et al. ................................. 345/98 |

* cited by examiner

*Primary Examiner*—Dennis-Doon Chow
*Assistant Examiner*—Fritz Alphonse
(74) *Attorney, Agent, or Firm*—Smith, Gambrell & Russell, LLP

(57) ABSTRACT

A flat panel display apparatus and a method for interfacing pixel data therein are disclosed. The method, for interfacing pixel data from a frame memory whose every line has L (where $L \leq 3N \times M$; N is a bit number of one word of respective red, green, and blue, M is a minimum integer which is greater than a quotient of S/N, and S is a number of samples of respective red, green and blue per line) units of one-bit pixel data stored therein to Q (where Q is a least integer which is greater than a quotient of L/2P) units of address electrode driving integrated circuits respectively having both N/2 input pins and P (where P is a common multiple of 3 and N/2) output pins, repeats every data corresponding to ½ lines over G times, reading 3N/2-bit red, green and blue data in $\{A+G(n-1)\}$-numbered sequence (where A is an initial address value of respective data groups, G is a least integer which is greater than a quotient of M/Q and represents a group number, and $1 \leq n \leq Q$) among M units of 3N/2-bit red, green and blue data sequences over Q times in sequence every data corresponding to ½ lines from said frame memory, stores the read 3N/2-bit red, green and blue data over Q times in a first storage area and, simultaneously, outputs $\{(N/2) \cdot Q\}$-bit data sequences over three times from a second storage area having previous data stored therein, and repeats both reading the data from said first storage area and outputting the data from said second storage area alternately over G times.

18 Claims, 11 Drawing Sheets

FLAT PANEL DISPLAY APPARATUS AND METHOD FOR INTERFACING DATA THEREOF

BACKGROUND OF THE INVENTION

1. Field of the Invention

The present invention relates to a flat panel display apparatus, and more particularly, relates to a video data processing in which video data is processed by a flat panel display apparatus adopting a red-green-blue strip-type plasma display panel and in which the interfaces pixel data from a frame memory to an address electrode drive section.

2. Description of the Prior Art

Currently, as television sets (hereinafter, referred to as "TV") have become more widely used, consumers are demanding slim display apparatuses which have wide screens and which are easily installable. In view of consumers' needs, the existing cathode ray tube (referred to as "CRT") has started to reveal limitations thereof. Thus, the existing display equipment such as the CRT has come to be replaced by a so-called flat panel display (hereinafter, referred to as "FPD") apparatus that has a wide display area and that is slim as well. Further, recently, research projects therein are in progress enthusiastically at home and abroad.

This kind of the FPD device is largely divided into an emissive device and a non-emissive device. The emissive device is usually called an active emitting device and is a device which emits a light by itself. Representative examples of the emissive device are a field emission display (referred to as "FED") device, a vacuum fluorescent display (referred to as "VFD") type device, an electro-luminescence (referred to as "EL") type device, a plasma display panel (hereinafter, referred to as "PDP") and the like. The non-emissive device is called a passive light emitting device, and representative examples of the non-emissive device are a liquid crystal display (referred to as "LCD") device, an electro-chromic display (referred to as "ECD"), an electro-phoretic display (referred to as "EPID") and the like.

Currently, the LCD device occupies the main stream in products such as desk clocks, calculators, lap-tops and the like. However, when this device is adopted to television sets having the screen size of 21 inches and over, it also shows the limitations up to now due to problems in a manufacturing process of a panel and in obtaining an acceptable product. Further, it has the disadvantages of having a narrow visual field angle and of having a response rate which is subject to a temperature variation. Recently, the PDP is newly attracting public attention as the flat panel display of the next generation which is capable of solving the problems of the LCD device.

Because the PDP emits a light by itself in a principle which is similar to that of a fluorescent lamp, it has a uniform brightness and a high contrast although a screen area is as wide as the screen area of the CRT. In addition, the PDP has a visual field angle of 140 degrees and above, and is well-known as the best wide screen display device which has a screen size of 21 to 55 inches. The panel manufacturing process of the PDP is simplified as compared with that of the LCD device and thereby saves a manufacturing cost. However, because the manufacturing cost of the PDP is more than that of the CRT, manufacturers are carrying out searches to reduce the manufacturing cost.

The plasma display is largely classified into a direct current (referred to as "DC") type and an alternating current (referred to as "AC") type according to a structural difference of a discharge cell thereof and a form of a driving voltage based on the structural difference. The DC type is driven by a DC voltage, whereas the AC type is driven by a sinusoidal AC voltage or by a pulse voltage. The AC type includes such a structure that a dielectric layer covers an electrode to serve as a current regulation resistor, whereas the DC type includes such a structure that an electrode is exposed to a discharge room as it is and that a discharge current comes to flow during a supply of the discharge voltage. Because the AC type has the electrode which is covered with the dielectric, it is more durable than the DC type. The AC type has a further advantage in that a wall electric charge which is generated on a surface of the dielectric as a result of a polarization, causes the cell to have a memory function therein, and is more applicable in the field of display devices than the others.

A color PDP includes a structure of 3 terminals wherein a special electrode is installed in order to improve discharge characteristics thereof. Namely, the 3-terminal structure comprises 3 electrodes per unit cell for display which are an address electrode for entering data, a maintenance electrode for sequentially scanning a line and for maintaining a cell discharge, and a bus electrode for helping a discharge maintenance.

A number of the address electrode for entering data is determined in accordance to a horizontal resolution. For example, in the case where a number of samples per line is 853 for each of the red, green and blue colors, a total number of the samples comes to 2559. Therefore, a required number of the address electrodes is also 2559. In the case where an arrangement of the address electrode has a strip form, red, green and blue electrodes are arranged repeatedly.

As described above, because a circuit arrangement of an electrode driving section is restricted considering a space utilization when thousands the address electrodes are arranged on one side, an upper and lower electrode driving system is adapted wherein the section for driving 1280 electrodes, which are ordered in an odd-numbered sequence, are arranged at an upper end portion of a panel whereas the section for driving 1279 electrodes, which are ordered in an even-numbered sequence, are arranged at a lower end portion thereof (refer to U.S. Pat. No. 4,695,838).

Meanwhile, in order to display a TV signal of a system of national television system committee (hereinafter, referred to as "NTSC") on the PDP, a data processing section converts an interlaced scanning system into a sequential scanning system, and also converts data into data of a subfield system for a PDP contrast processing. Further, the data processing section provides 1280 red-green-blue (hereinafter, referred to as "RGB") pixel data per line to the electrode driving section for driving the upper and lower address electrodes of the panel of the PDP in harmony with the arrangement of the address electrode.

Conventionally, a video data processing section of the PDP comprises a data rearranging section for rearranging digital RGB sample data into subfield data for a contrast processing, a frame memory section for converting one scanning system into the other, a data interfacing section, and a timing control section. In particular, the data interfacing section provides previously-latched 2559 pixel data to the upper and lower electrode driving sections in harmony with the arrangement of the upper and lower electrodes while latching 2559 pixel data corresponding to 1 line which is supplied from the memory section. The data interfacing section is configured with an application specific integrated circuit (referred to as "ASIC"), and includes 5118 data latches for storing the pixel data corresponding to 2 lines, a demultiplexer for a data input, and a multiplexer for a data output.

A configuration of the data interfacing section which is composed in ASIC is depended on by the memory section and the address electrode driving section, so that when the data interfacing section is designed, a system designer has to consider a number of input/output pins, a complicated degree of an inside circuit configuration, and an input/output line pattern of data.

SUMMARY OF THE INVENTION

Therefore, in order to settle the problems of the prior art as described above, it is an object of the present invention to provide a flat panel display apparatus and to provide a method for interfacing data which can simplify the configuration of a circuit by reducing a size of data temporality storing area of the data interfacing section and can decrease the cost of products by reducing a number of external contact pins.

In order to achieve the above object, the present invention provides a first method for interfacing pixel data from a frame memory whose every line has L (where L≦3N×M; N is a bit number of one word of respective red, green, and blue, M is a minimum integer which is greater than a quotient of S/N, and S is a number of samples of respective red, green and blue per line) units of one-bit pixel data stored therein to Q (where Q is a least integer which is greater than a quotient of L/2P) units of address electrode driving integrated circuits respectively having both N/2 input pins and P (where P is a common multiple of 3 and N/2) output pins, which comprises the steps of:

repeating, every data corresponding to ½ lines over G times, reading 3N/2-bit red, green and blue data in {A+G(n−1)}-numbered sequence (where A is an initial address value of respective data groups, G is a least integer which is greater than a quotient of M/Q and represents a group number, and 1≦n≦Q) among M units of 3N/2-bit red, green and blue data sequences over Q times in sequence every data corresponding to ½ lines from the frame memory;

storing the read 3N/2-bit red, green and blue data over Q times in a first storage area and, simultaneously, outputting {(N/2)·Q}-bit data sequences over three times from a second storage area having previous data stored therein; and repeating both reading the data from the first storage area and outputting the data from the second storage area alternately over G times.

In order to achieve the above object, the present invention provides a first flat panel display apparatus having a flat display panel wherein a resolution thereof is 3S×H (where S and H respectively represent a number of samples of respective red, green and blue per line and a number of horizontal scanning lines) and wherein 3S units of red, green and blue strip-shaped address electrodes are alternately arranged to be driven by upper and lower portions of the panel, which comprises:

a memory for entering N subfield data having L (where L≦3N×M; N is a bit number of one word of respective red, green, and M is a least integer which is greater than a quotient of S/N) units of one-bit pixel data every one line and having H/2 scanning lines in an interlaced scanning system in a first frame memory area, for, simultaneously, repeating, every data corresponding to one line in a sequential scanning system over G times, reading 3N-bit red, green and blue data in {A+G(n−1)}-numbered sequence (where A is an initial address value of respective data groups, G is a least integer which is greater than a quotient of S/Q and represents a group number, and 1≦n≦Q) among M units of 3N-bit red, green and blue data sequences over Q times in sequence every data corresponding to one line from a second memory area having previous N subfield data stored therein;

a data interfacing means, including a pair of data storage sections each for provisionally storing data corresponding to upper and lower driving electrodes, for sequentially storing the read 3N/2-bit red, green and blue data over Q times in a first storage area and, for, simultaneously, outputting {(N/2)·Q}-bit data over three times from a second storage area having previous data stored therein, for alternately repeating both reading the data from the first storage area and outputting the data from the second storage area over G times; and means for sequentially inputting {(N/2)·Q}-bit data from said data interfacing means in parallel over 3G times, and for, in order to drive L/2 address electrodes with the inputted pixel data, driving upper and lower address electrodes, respectively including Q (where Q is a least integer which is greater than a quotient of L/2P) address electrodes driving integrated circuits having both N/2 input pins and P (where P is a common multiple of 3 and N/2) output pins.

In order to achieve the above object, the present invention provides a second method for interfacing pixel data from a frame memory whose every line has L (where L≦3N×M ; N is a bit number of one word of respective red, green, and blue, M is a minimum integer which is greater than a quotient of S/N, and S is a number of samples of respective red, green and blue per line) units of one-bit pixel data stored therein to Q (where Q is a least integer which is greater than a quotient of L/2P) units of address electrode driving integrated circuits respectively having both N/2 input pins and P (where P is a common multiple of 3 and N/2) output pins, which comprises the steps of:

repeating, every data corresponding to 1 line over G times, reading 3N/2-bit red, green and blue data in {A+G(n−1)}-numbered sequence (where A is an initial address value of respective data groups, G is a least integer which is greater than a quotient of S/(Q/2) and represents a group number, and 1≦n≦Q/2) among M units of 3N/2-bit red, green and blue data sequences over Q/2 times in sequence every data corresponding to 1 lines from the frame memory;

storing the read 3N/2-bit red, green and blue data over Q/2 times in a first and a second storage areas and, simultaneously, outputting {(N/2)·(Q/2)}-bit data sequences over 6 times from a third and a fourth storage areas having previous data stored therein; and repeating both reading the data from the first and the second storage areas and outputting the data from the third and the fourth storage areas alternately over G/2 times.

In order to achieve the above object, the present invention provides a second flat panel display apparatus having a flat display panel wherein a resolution thereof is 3S×H (where S and H respectively represent a number of samples of respective red, green and blue per line and a number of horizontal scanning lines) and wherein 3S units of red, green and blue strip-shaped address electrodes are alternately arranged to be driven by upper and lower portions of the panel, which comprises:

a memory for entering N subfield data having L (where L≦3N×M; N is a bit number of one word of respective red, green and blue, and M is a least integer which is greater than a quotient of S/N) units of one-bit pixel data every line and having H/2 scanning lines in an interlaced scanning system in a first frame memory area, for, simultaneously, repeating, every data corresponding to one line in a sequential scanning system over G times, reading 3N-bit red, green and blue data in {A+G(n−1)}-numbered sequence (where A is an initial address value of respective data groups, G is a least integer which is greater than a quotient of S/Q and represents a group number, and 1≦n≦Q/2) among M units of 3N-bit red, green and blue data sequences over Q times in sequence every data corresponding to one line from a second memory area having previous N subfield data stored therein;

a data interfacing means, including a pair of data storage sections each for provisionally storing data corresponding to upper and lower driving electrodes, for sequentially storing the read 3N/2-bit red, green and blue data over Q/2 times in a first and a second storage area, for, simultaneously, outputting {(N/2)·(Q/2)}-bit data over 6 times from a third and a fourth storage areas having previous data stored therein, and for alternately repeating both reading the data from the first and the second storage areas and outputting the data from the third and the fourth storage areas over G/2 times; and means for, sequentially and alternately, inputting {(N/2)·(Q/2)}-bit data from the data interfacing means in parallel over 3×(G/2) times into integrated circuits of an odd-numbered sequence and of an even-numbered sequence, and for, in order to drive L/2 address electrodes with the inputted pixel data, driving upper and lower address electrodes, respectively including Q (where Q is a least integer which is greater than a quotient of L/2P) address electrodes driving integrated circuits having both N/2 input pins and P (where P is a common multiple of 3 and N/2) output pins.

In order to achieve the above object, the present invention provides a third method for interfacing pixel data from a frame memory whose every line has L (where L≦3N×M; N is a bit number of one word of respective red, green, and blue, M is a minimum integer which is greater than a quotient of S/N, and S is a number of samples of respective red, green and blue per line) units of one-bit pixel data stored therein to Q (where Q is a least integer which is greater than a quotient of L/2P) units of address electrode driving integrated circuits respectively having both N/2 input pins and P (where P is a common multiple of 3 and N/2) output pins, which comprises the steps of:

repeating, every data corresponding to 1 line over G times, reading 3N/2-bit red, green and blue data in {A+G(n−1)}-numbered sequence (where A is an initial address value of respective data groups, G is a least integer which is greater than a quotient of M/Q and represents a group number, and 1≦n≦Q/2) among M units of 3N/2-bit red, green and blue data sequences over Q/2 times in sequence every data corresponding to 1 line from the frame memory;

storing the read 3N/2-bit red, green and blue data over Q/2 times in a first storage area and, simultaneously, outputting {(N/2)·(Q/2)}-bit data sequences over 3 times from a second storage area having previous data stored therein; and repeating both reading the data from the first storage area and outputting the data from the second storage area alternately over G times.

In order to achieve the above object, the present invention provides a third flat panel display apparatus having a flat display panel wherein a resolution thereof is 3S×H (where S and H respectively represent a number of samples of respective red, green and blue per line and a number of horizontal scanning lines) and wherein 3S units of red, green and blue strip-shaped address electrodes are alternately arranged to be driven by upper and lower portions of the panel, which comprises:

a memory for entering N subfield data having L (where L≦3N×M; N is a bit number of one word of respective red, green and blue, and M is a least integer which is greater than a quotient of S/N) units of one-bit pixel data every one line and having H/2 scanning lines in an interlaced scanning system in a first frame memory area, and for, simultaneously, repeating, every data corresponding to one line in a sequential scanning system over G times, reading 3N-bit red, green and blue data in {A+G(n−1)}-numbered sequence (where A is an initial address value of respective data groups, G is a least integer which is greater than a quotient of S/Q and represents a group number, and 1≦n≦Q/2) among M units of 3N-bit red, green and blue data sequences over Q times in sequence every data corresponding to one line from a second memory area having previous N subfield data stored therein;

a data interfacing means, including a pair of data storage sections each for provisionally storing data corresponding to upper and lower driving electrodes, for sequentially storing the read 3N/2-bit red, green and blue data over Q/2 times in a first storage area, for, simultaneously, outputting {(N/2)·(Q/2)}-bit data over 3 times from a second storage area having previous data stored therein, and for alternately repeating both reading the data from the first storage area and outputting the data from the second storage area over G times; and means for, sequentially and alternately, inputting {(N/2)·(Q/2)}-bit data from the data interfacing means by serial 3 times in parallel over G times into integrated circuits of an odd-numbered sequence and of even-numbered sequence, and for, in order to drive L/2 address electrodes with the inputted pixel data, driving upper and lower address electrodes, respectively including Q (where Q is a least integer which is greater than a quotient of L/2P) address electrodes driving integrated circuits having both N/2 input pins and P (where P is a common multiple of 3 and N/2) output pins.

BRIEF DESCRIPTION OF THE DRAWINGS

The above objects and other advantage of the present invention will become more apparent by describing in detail a preferred embodiment thereof with reference to the attached drawings, in which.

DESCRIPTION OF THE PREFERRED EMBODIMENTS

A description will be given below in detail with reference to accompanying drawings to a configuration and an operation of a flat panel display apparatus and a method for processing video data thereof according to embodiments of the present invention.

Embodiment 1

Figure 1:
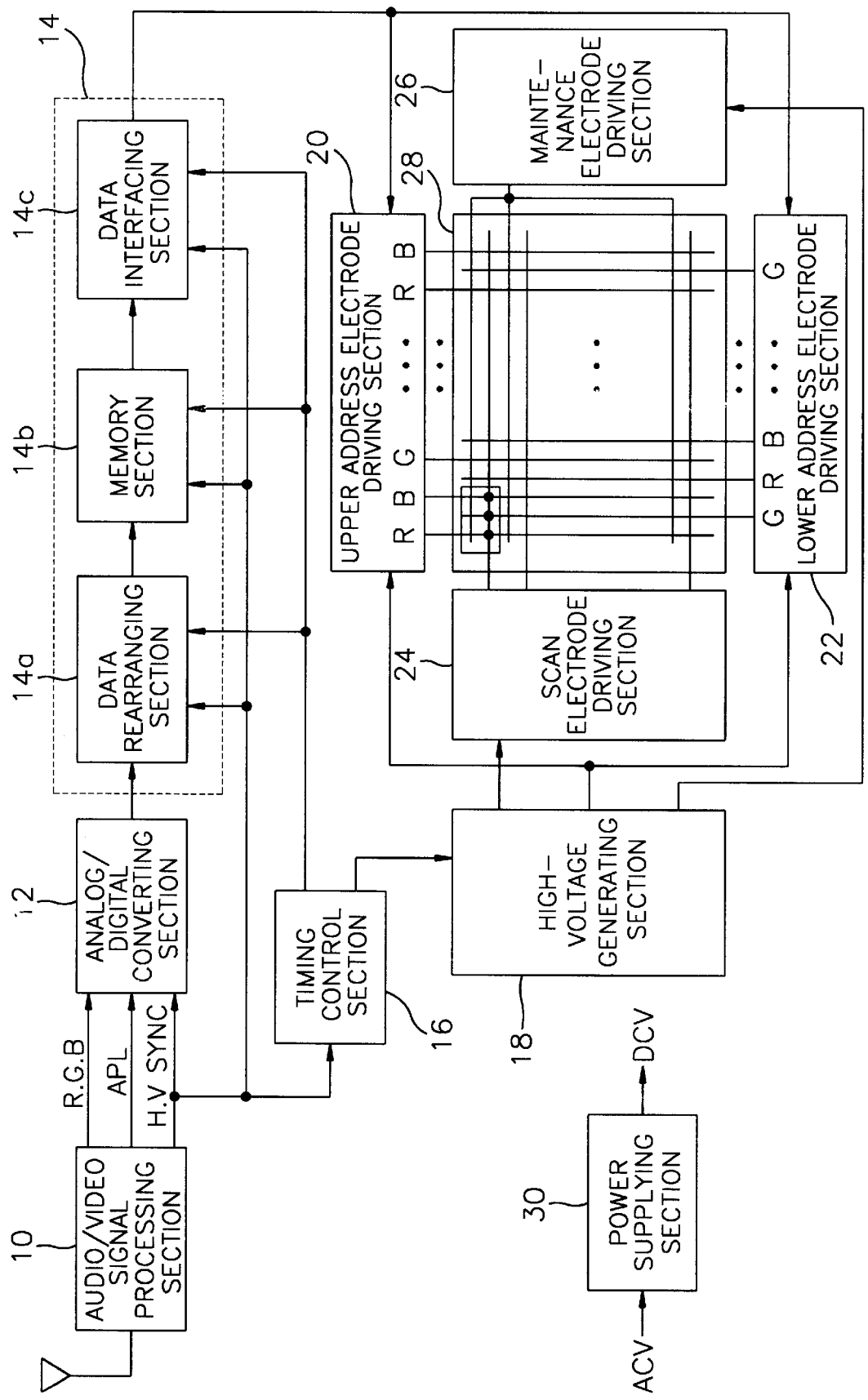
FIG. 1 is a block diagram for showing a circuit configuration of a plasma display panel television set which is a preferred embodiment of a flat panel display apparatus according to the present invention.
Figure 2:
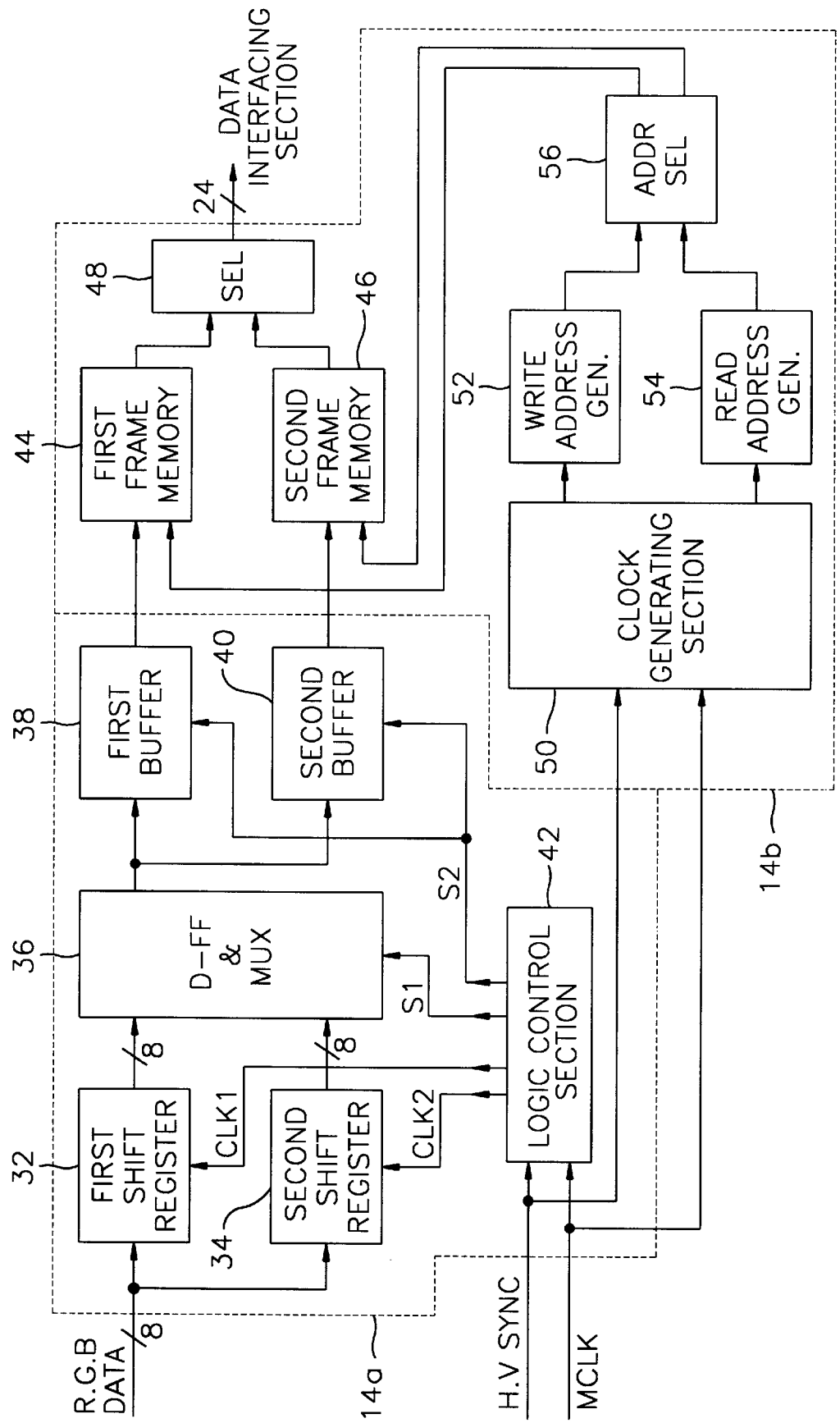
FIG. 2 is a schematic diagram for showing a preferred embodiment of a data rearranging section and a memory section of a data processing section shown in FIG. 1.

FIG. 1 is a block diagram for showing a circuit configuration of a plasma display panel television set which is a preferred embodiment of a flat panel display apparatus according to the present invention. A PDP-TV includes a video processing section for converting an NTSC composite video signal into a signal form which is adapted to the PDP-TV system, and a driving circuit section for displaying processed video data via a panel thereof.

Broadly speaking, a composite video signal which is received via an antenna, is analog-processed by an audio/video (referred to as "A/V") signal processing section 10, and an analog-processed signal is then digitized to a prescribed video signal by an analog-to-digital converter (referred to as "ADC") 12. Afterwards, while passing through a data rearranging section 14a, memory section 14b and data interfacing section 14c of a data processing section 14, this video data is converted into a data stream which is adapted to a contrast-processing characteristics of the PDP, and a converted data stream is then provided to an address electrode driving section 20 and 22.

Under the control of a timing control section 16, a high-voltage generating section 18 provides a high-voltage control pulse which is required by an upper address electrode driving section 20, a lower address electrode driving section 22, a scan electrode driving section 24 and a maintenance electrode driving section 26, and a power supplying section 30 inputs an AC voltage (referred to as "ACV") to produce all of DC voltages (referred to as "DCV's") which are required by a whole system.

A/V signal processing section 10 inputs the NTSC composite video signal to separate an analog RGB and a horizontal or vertical synchronizing signal H.V SYNC, and produces an average picture level (referred to as "APL"), which corresponds to an average value of a luminance signal, and, which is then provided to ADC 12.

The interlaced scanning system is adopted for the NTSC composite video signal whose one frame consists of two fields of respectively even-and odd-numbered sequences, and whose horizontal and vertical synchronizing signals have frequencies of 15.73 [KHz] and 60 [Hz], respectively. An audio signal which is separated from the composite video signal is directly provided to a speaker via an audio amplifier.

ADC 12 inputs the analog RGB signal to convert an inputted analog RGB signal into digital data, and provides converted digital data to data processing section 14. Here, the digital data is video data whose signal form is converted for a brightness improvement of the PDP-TV system. ADC 12 amplifies the analog RGB signal and the APL signal to have signal levels thereof which are adapted to a quantization, and converts the vertical and horizontal synchronizing signals to have prescribed phases thereof. Also, ADC 12 generates a clock by using a phase-locked loop (referred to as "PLL") in order to use a sampling clock as a clock which is synchronized with an input synchronizing signal.

The PLL compares a phase of a variable pulse from a loop with a phase of an input synchronizing signal, and provides a clock which is synchronized with the input synchronizing signal. In the case where the clock, which is not synchronized with the input synchronizing signal, is used, a vertical linearity of a picture to be displayed is not ensured.

Also, ADC 12 sets vertical and horizontal positions of a sampling area. In a vertical position section, only lines which include the video signal among the input signals are set. In a horizontal position section, only time which includes the video signal among the lines which is set to the vertical position, is set. Both the vertical position section and the horizontal position section are a reference for a sampling. As illustrated in Table 1, a total of 480 lines is selected in the 240 lines of units for the vertical position section. The horizontal position section has to correspond to a time interval in which at least 853 sampling clocks can exists per line.

Also, ADC 12 maps the RGB data to data which coincides with a brightness characteristic of the PDP and outputs a mapped RGB data. Namely, ADC 12 includes a read only memory (referred to as "ROM") which has a plurality of vector tables recorded therein, and then maps an optimal vector table read from the ROM 1 to 1 in accordance with a digitized APL data to provide an improved form of RGB data to data processing section 14.

TABLE 1

| items | 1 frame | | remarks |
| --- | --- | --- | --- |
| | odd | even | |
| a total line | 1 H–262.5 H | 262.5 H–525 H | NTSC TV |
| an active line | 22 H–263 H | 284 H–525 H | |
| a selective line | 23 H–262 H | 285 H–524 H | |

In order to process the contrast of the PDP, data rearranging section 14a of data processing section 14 is required to reconfigure the video data into a plurality of subfields, and then to rearrange data bits from the most significant bit (referred to as "MSB") to the least significant bit (referred to as "LSB").

Data rearranging section 14a comprises first and second shift registers 32, 34, a D flip-flop and a multiplexer 36, first and second buffers 38, 40, and a logic control section 42 and performs rearrangement so that the video data provided in parallel may be stored at a location specified by an address of a frame memory as bits having the same weight.

In second shift register 34, previously loaded 8 units of 8-bit sample video data is sequentially shifted from a most upper bit to a least lower bit and is outputted therefrom in response to a second shift clock signal CLK2 while first shift register 32 loads 8 units of 8-bit sample video data in response to a first shift clock signal CLK1. D flip-flop and multiplexer 36 selects data having the same weight outputted from a shift mode among the 8 units of b-bits sample video data in response to a first control signal S1 and supplies the selected data to first and second buffers 38, 40. First and second buffers 38, 40 executes an operation which connects the rearranged video data with the frame memory of a write mode in response to a second control signal S2.

Logic control section 42 receives a synchronizing signal H.V SYNC and a main clock signal MCLK, and generates first and second shift clock signals CLK1, CLK2 and first and second control signals S1, S2,respectively.

Memory section 14b of data processing section 14 comprises first and second frame memories 44, 46, a data selector 48, a clock generating section 50, a write and a read address generating section 52, 54, and an address selector 56.

In respective frame memories 44, 46, an odd-numbered field and an even-numbered field are sequentially stored by an interlaced scanning.

Data selector 48selects video data which is outputted from read/write mode between first and second frame memories 44, 46 and provides the selected video data to data interfacing section 14c.

Clock generating section 50 receives synchronizing signal H.V SYNC and main clock MCLK, and generates a write and a read address clock and logic control pulses which needs to drive the memory.

Write and read address generating sections 52, 54 convert the video data which is inputted by an interlaced scanning method into the video data of non-interlaced scanning method and displays, so that an order of write address and read address is differentiated. Namely, write and read address generating sections 52, 54 repeatedly execute an operation which reads an even-numbered line data after reading an odd-numbered line data corresponding to 1 line in order to read video data of 1 frame stored in memory section 14b. Also, the data reading operation corresponding to respective lines is repeatedly executed according to the size of a storing area of data interfacing section 14c over a number of times.

For example, in case the size of the storing area corresponding to ⅕ of the size, write and read address generating section 52, 54 repeats a reading operation which sequentially reads 24 bits RGB data of A+5(n−1)-numbered sequence (where A is an initial address value of each data groups, 1≦n≦22) over 22 times among 107 units of 24-bit RGB data over 5 times.

Additionally, write and read address generating sections 52, 54 divide 1 field into 8 subfields for contrast processing of the PDP, sequentially reads the video data corresponding to a respective subfields, and provides the read video data to data interfacing section 16, so that write and read address generating section 52, 54 have a reading order which differs from an writing order. Therefore, write and read address generating sections 52, 54 need a write address generator 52 and a read address generator 54 according to the designed memory map configuration. Address selector 56 provides a correspondence address according to the respective operation modes of first and second frame memories 44, 46.

Figure 3:
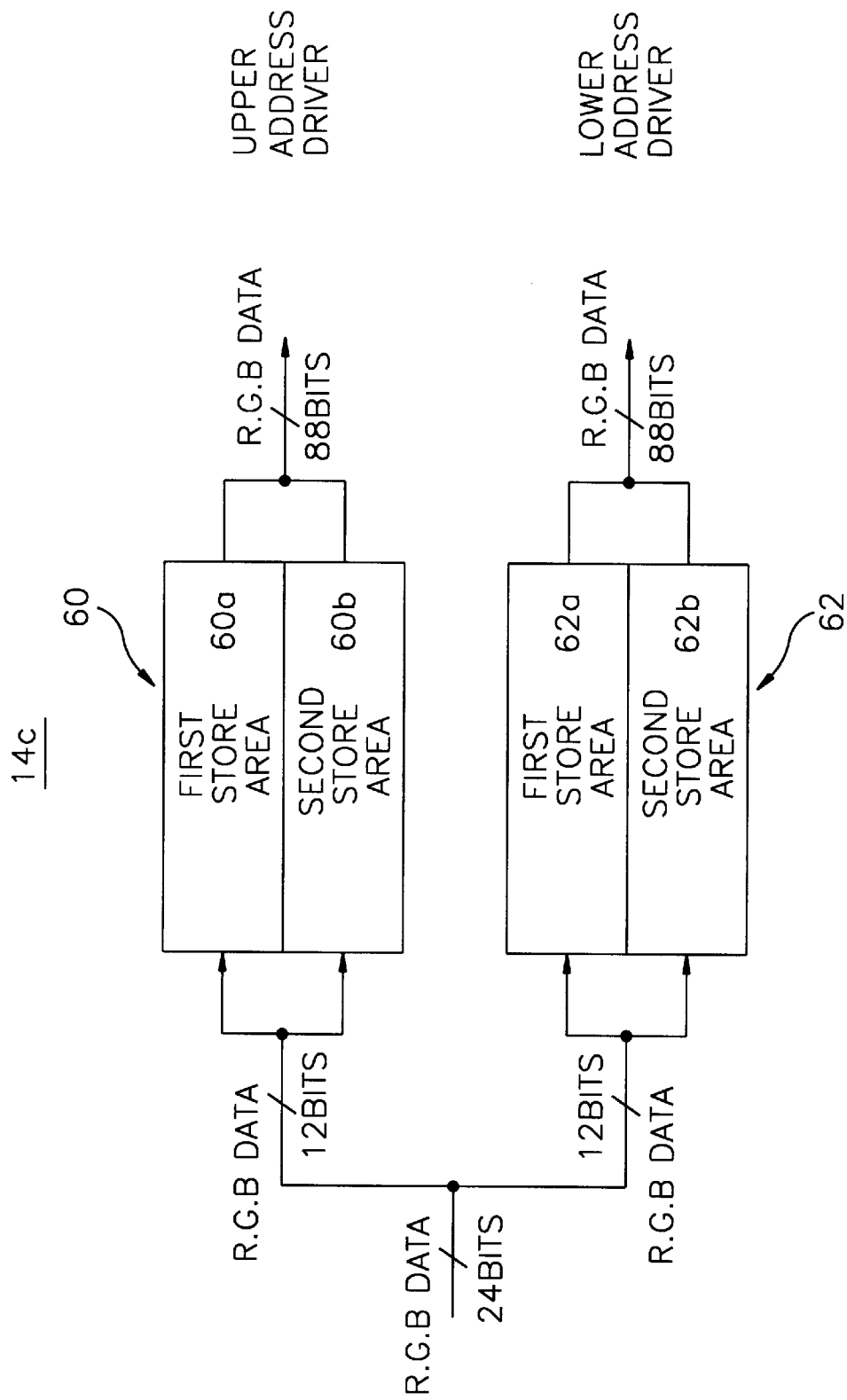
FIG. 3 is a schematic diagram for showing a preferred embodiment of a data interfacing section of the data processing section shown in FIG. 1.

FIG. 3 is a schematic diagram for showing a preferred embodiment of a data interfacing section of the data processing section shown in FIG. 1. Data interfacing section 14c rearranges RGB data which is outputted from memory section 14b corresponding to arrangement of RGB pixel of display section 28 and provides the RGB data to an address driving integrated circuit. Namely, data interfacing section 14ctemporarily stores RGB data inputted from memory section 14b, and then rearranges the RGB data as a data form which is required from upper and lower address electrode driving sections 20, 22 and provides the RGB data to upper and lower address electrode driving sections 20, 22.

Data interfacing section 14c comprises a pair of data storing sections 60, 62. Pair of data storing sections 60, 62 corresponds to upper and lower address electrode driving sections 20, 22,respectively. 12 bits of data corresponding to upper address electrode is provided to data storing section 60 and 12 bits of data corresponding to lower address electrode is provided to data storing section 62 among 24 bits of data provided from memory, respectively.

Respective data storing sections 60, 62 comprise first storing areas 60a, 62a and second storing areas 60b, 62b, respectively. Respective storing areas store 22 units of 12-bit data and output 88 bits of data over 3 times.

Figure 4:
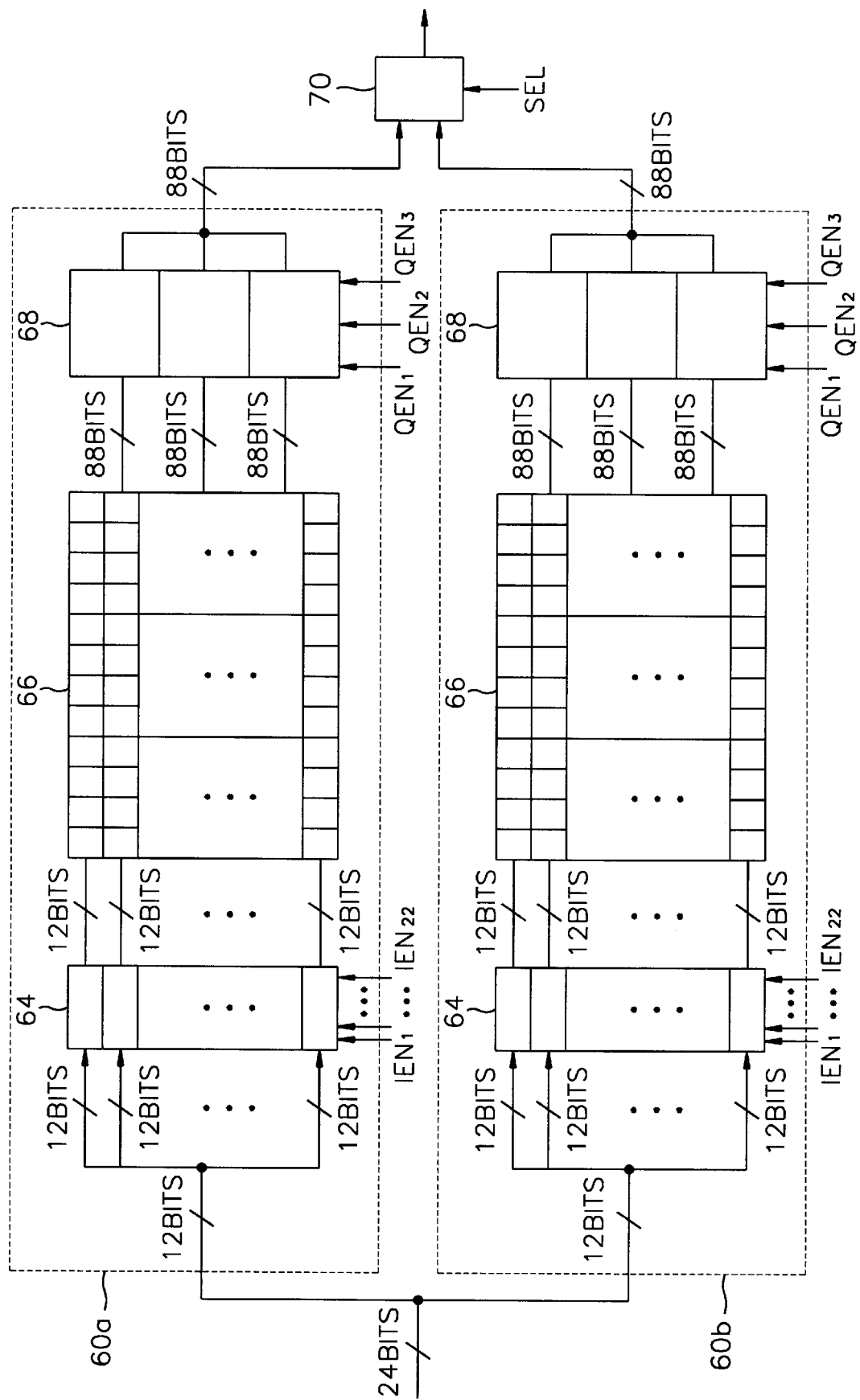
FIG. 4 is a schematic diagram for showing a detailed circuit configuration of the data interfacing section shown in FIG. 3.

FIG. 4 illustrates a detailed circuit configuration of the data interfacing section. Respective storing areas comprise 22 units of 12-bit input buffer 64, D flip-flops 66 of 12 columns×22 rows, and 3 units of 88-bit output buffer 68. Respective 12 bits of input buffers 64 are sequentially enabled in response to 33 units of enable signal IEN1–IEN22, respectively and provide 12 bits of data to 12 units of D flip-flop of respective rows. Respective 88 bits of output buffers 64 are sequentially enabled in response to 3 units of enable signal OEN1–OEN3, respectively and output the latched 88 bits of data to D flip-flop of 4 columns×22 rows in parallel. Output selector 70 alternately selects over 5 times 88 bits of output data which is outputted over 3 times from the first and the second storing areas.

Figure 5:
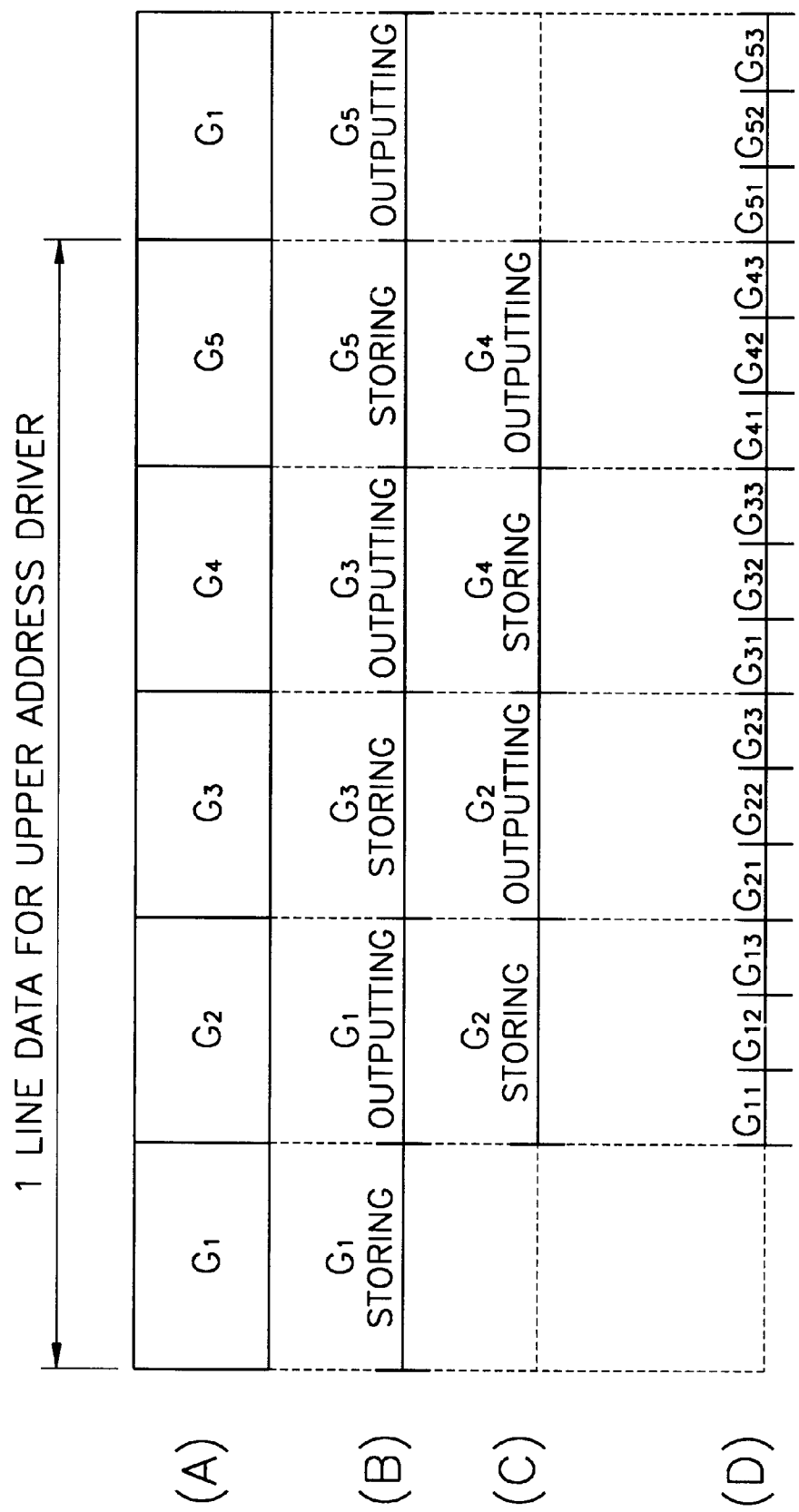
FIG. 5 is a view for illustrating a first embodiment of the method for data interfacing according to the present invention.

Referring to FIG. 5, a method for interfacing data according to an embodiment, sequentially stores 12 bits of data which is provided over 22 times from memory section in first storing area 60a and outputs data which is previously stored in second storing area 60b as 88 bits of data over 3 times. Accordingly, as the above described storing and outputting operation is repeatedly executed over 5 times, so that data corresponding to 1 line is provided as a data form which is required from the address electrode driving section. Namely, as shown in A of FIG. 5, if the memory section separates 1280 units of data for the upper address electrode corresponding to 1 line into 5 data groups G1–G5 and provides the separated data, as shown in B and C of FIG. 5, the data interfacing section outputs data of the other group which is previously stored while data of a group is stored. Each group data is outputted as 88 bits of data over 3 times, so that 1280 units of data corresponding to 1 line is provided to electrode driving section over 15 times, totally, as shown in D of FIG. 5.

High voltage generating section 18 generates a control pulse which is required from upper and lower address electrode driving sections 20, 22, scan electrode driving section 24, and maintenance electrode section 26 in order to drive the PDP by means of combining a direct current high voltage according to a control pulse of various logic level outputted from timing control section 16. Address electrode driving section boosts a voltage level of the data provided from data interfacing section 14c to a suitable voltage level which can be selectively written to display section 28.

Figure 6:
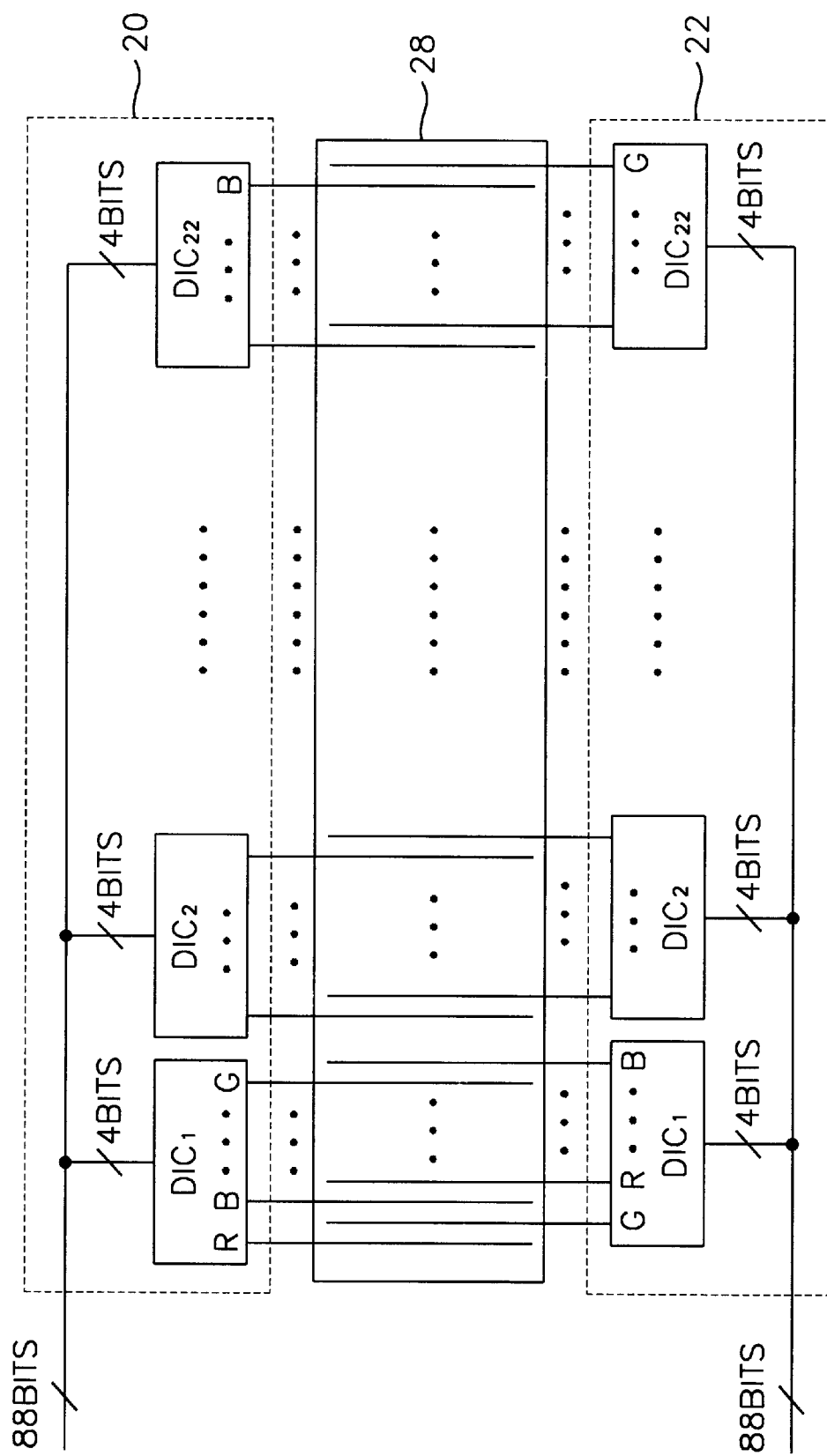
FIG. 6 is a schematic diagram for showing a circuit configuration of an upper and a lower address electrode driving section shown in FIG. 1.

In FIG. 6, a detailed circuit configuration of an address electrode driving sections 20, 22 is illustrated. Respective address electrode driving sections comprise 22 units of driving integrated circuits DIC1–DIC22. Respective driving integrated circuits have a 4-bit input pin and a 60-bit output pin and drive 60 RGB electrodes of strip-type by inputting 4 bits of data over 15 times, in total. R and B electrodes among the upper address electrode correspond to an odd-numbered sequence data corresponding to 1 line, and G electrodes correspond to an even-numbered sequence data corresponding to 1 line.

As the above described driving method for contrast processing of PDP according to an embodiment of the present invention, divides 1 field into some subfield (256 contrast –8 subfield) and writes video data corresponding to the respective subfields to display section 28 by line units via upper and lower address electrode driving sections 20, 22. Also, the driving method sequentially reduces a number of discharge maintenance pulses from a subfield which MSB data is written to an LSB subfield and executes the contrast processing into total discharge maintenance section according to combination thereof.

The same data is displayed twice in even and odd fields and thereby eliminates a flickering which accompanies a non-interlacing scan. A driving order of the divided subfields is described as follows.

1) An Entry and Elimination of a Whole Screen

In order to eliminate a wall electric charge which remains at a selected pixel after a discharge maintenance of a previous subfield, the wall electric charge is entered into a whole pixel for a short time which is not enough to be visible, and the whole pixel is then eliminated to eliminate all of the remaining wall electric charges and an initialization is achieved.

2) The Entry of Data

While shifting a scan pulse in sequence at a scan electrode, a relevant data is entered in the line of unit via an address electrode, and thereby forming the wall electric charge at a pixel which is intended to be discharged.

3) A Maintenance of a Discharge

The discharge of a pixel having the wall electric charge which is formed therein while alternately applying the maintenance pulse between the maintenance electrode and the scan electrode is initiated and is then maintained. At this time, because there exists a possibility of a peripheral pixel, which is entered, influencing another pixel, which is not entered, to produce an erroneous discharge, an elimination of a narrow range is performed every time after applying the maintenance pulse, and a correct discharge is then performed.

Embodiment 2

A second embodiment separates data corresponding to 1 line of the memory section into 6 groups. The second embodiment repeats a reading operation which sequentially reads 24 bits of RGB data of A+6(n–1)-numbered sequence (where A is an initial address value of each data group, $1 \leq n \leq 18$) over 18 times among 107 units of 24-bit RGB data, over 6 times.

Respective storing areas of data interfacing section store 18 units of 12-bit data. Each storing area outputs 76 bits of data over 3 times.

Figure 7:
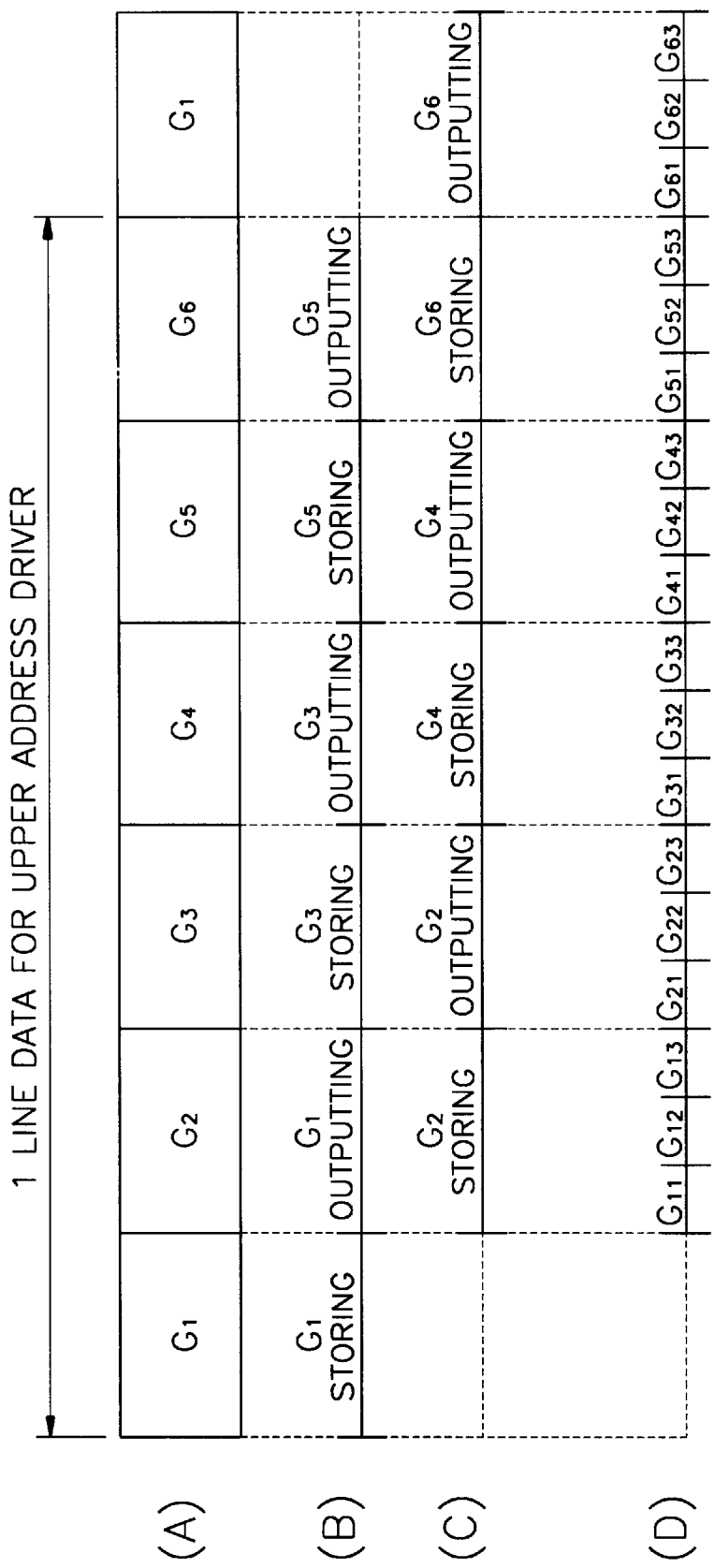
FIG. 7 is a view for illustrating a second embodiment of the method for data interfacing according to the present invention.

Namely, as shown in A of FIG. 7, if the memory section separates 1280 units of data for the upper address electrode corresponding to 1 line into 6 data groups G1–G6 and provides the separated data, as shown in B and C of FIG. 7, the data interfacing section outputs data of the other group which is previously stored while data of one group is stored. Each group data is outputted as 76 bits of data over 3 times, so that 1280 units of data corresponding to 1 line for the upper address electrode is provided to the electrode driving section over 15 times, totally, as shown in D of FIG. 7.

Address electrode driving section comprises 18 units of driving integrated circuits. Respective driving integrated circuits comprise a 4-bit input pin and a 72-bit output pin and drive 72 RGB electrodes of the strip-type by inputting the 4 bits data over 18 times, in total.

Accordingly, a number of data pins of the second embodiment is reduced from 88 to 72 while the data processing speed thereof gets faster than the data processing speed of the first embodiment by 15 times to 18 times.

Embodiment 3

A third embodiment separates data corresponding to 1 line of the memory section into 10 groups. The third embodiment repeats a reading operation which sequentially reads 24 bits of RGB data of A+10(n–1)-numbered sequence (where A is an initial address value of each data group, $1 \leq n \leq 11$) over 30 times among 107 units of 24-bit RGB data, over 10 times.

Data interfacing section comprises 4 units of storing area. Respective storing areas store 11 units of 12-bit data and output 44 bits of data over 3 times.

Figure 8:
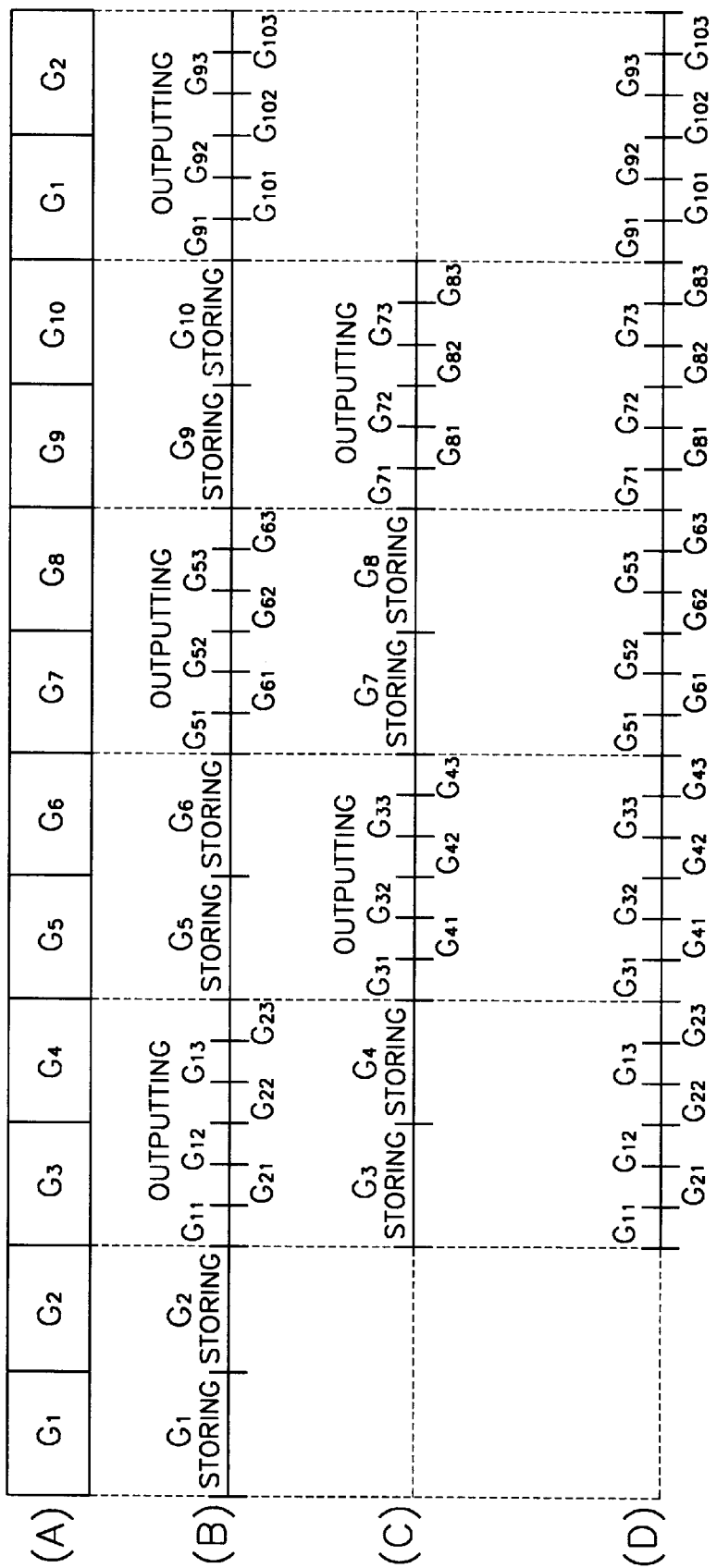
FIG. 8 is a view for illustrating a third embodiment of the method for data interfacing according to the present invention.

Namely, as shown in A of FIG. 8, if the memory section separates 1280 units of data for the upper address electrode corresponding to 1 line into 10 data groups G1–G10 and provides the separated data, as shown in B and C of FIG. 8, the data interfacing section outputs data of the other serial two groups which is previously stored while data of serial two groups is stored. Each group data is alternately outputted as 44 bits of data over 6 times, so that 1280 units of data corresponding to 1 line for upper address electrode is provided to electrode driving section over 30 times, in total, as shown in D of FIG. 8.

Address electrode driving section comprises 22 units of driving integrated circuits. Thus, 44 bits of data is alternately loaded into respective 22 units of driving integrated circuits of an odd-numbered sequence and an even-numbered sequence over 15 times. Respective driving integrated circuits comprise a 4-bit input pin and a 72-bit output pin and drive 60 RGB electrodes of the strip-type by inputting the 4 bits of data over 30 times, in total.

Accordingly, a number of data pins of the data interfacing section of the third embodiment is reduced to 44 while the data processing speed thereof gets faster than the data processing speed of the other embodiments by 30 times.

Embodiment 4

A fourth embodiment separates data corresponding to 1 line of the memory section into 12 groups. The fourth embodiment repeats a reading operation which sequentially reads 24 bits of RGB data of A+12(n–1) (where A is an initial address value of each data group, $1 \leq n \leq 36$) numbered sequence over 36 times among 107 units of 24-bit RGB data, over 12 times.

The data interfacing section comprises 4 units of storing areas. Respective storing areas store 9 units of 12 bit-data and output 36 bits of data over 3 times.

Figure 9:
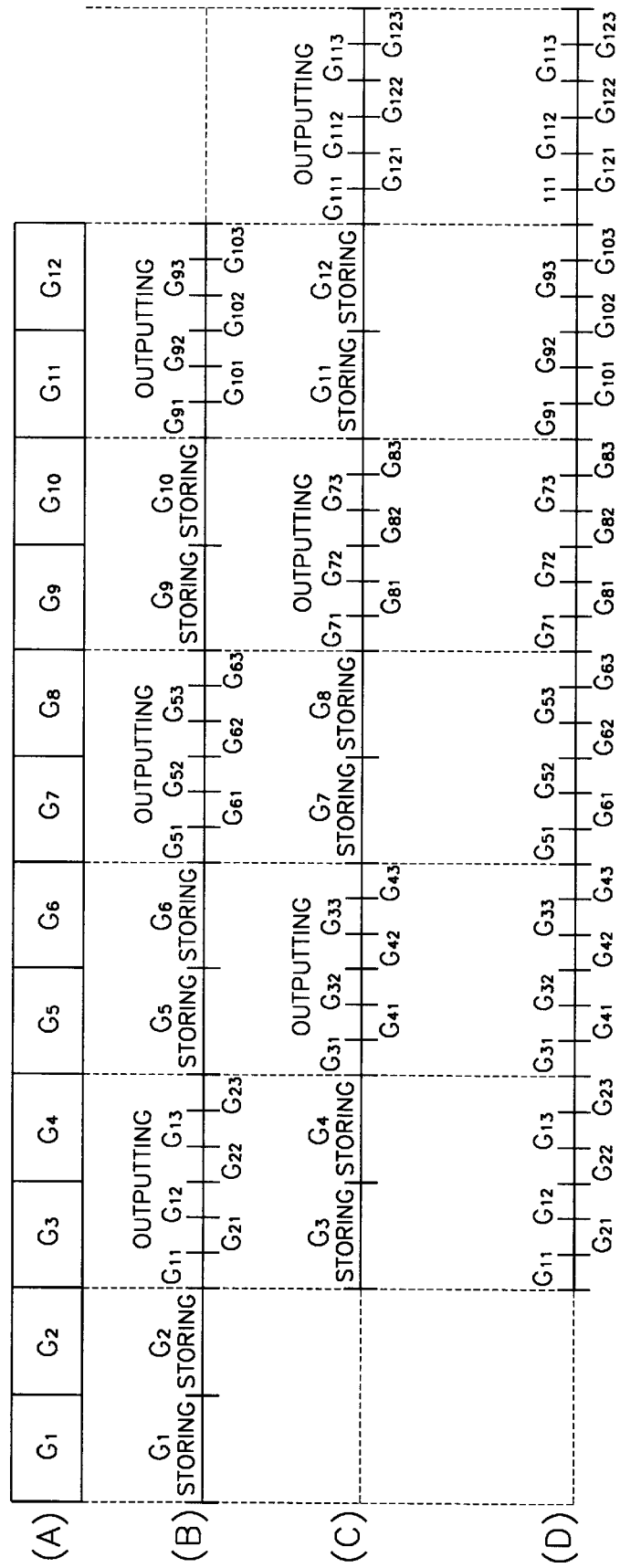
FIG. 9 is a view for illustrating a fourth embodiment of the method for data interfacing according to the present invention.

Namely, as shown in A of FIG. 9, if the memory section separates 1280 units of data for the upper address electrode corresponding to 1 line into 12 data groups G1–G12 and provides the separated data, as shown in B and C of FIG. 9, the data interfacing section outputs data of the other set of serial two groups which is previously stored while data of one set of serial two groups is stored. Each group data is alternately outputted as 36 bits of data over 6 times, so that 1280 units of data corresponding to 1 line for the upper address electrode is provided to the electrode driving section over 36 times, in total, as shown in D of FIG. 9.

Address electrode driving section comprises 18 units of driving integrated circuits. Thus, 36 bits of data are alternately loaded into an odd-numbered sequence and an even-numbered sequence among 18 units of driving integrated circuits over 18 times, respectively. Respective driving integrated circuits comprise a 4-bit input pin and a 72-bit output pin and drive 72 RGB electrodes of the strip-type by inputting the 4 bits of data over 36 times, in total.

Accordingly, a number of data pins of the data interfacing section of the fourth embodiment is reduced to 36 while the data processing speed thereof gets faster than the data processing speed of the above described other embodiments by 36 times.

Embodiment 5

Figure 10:
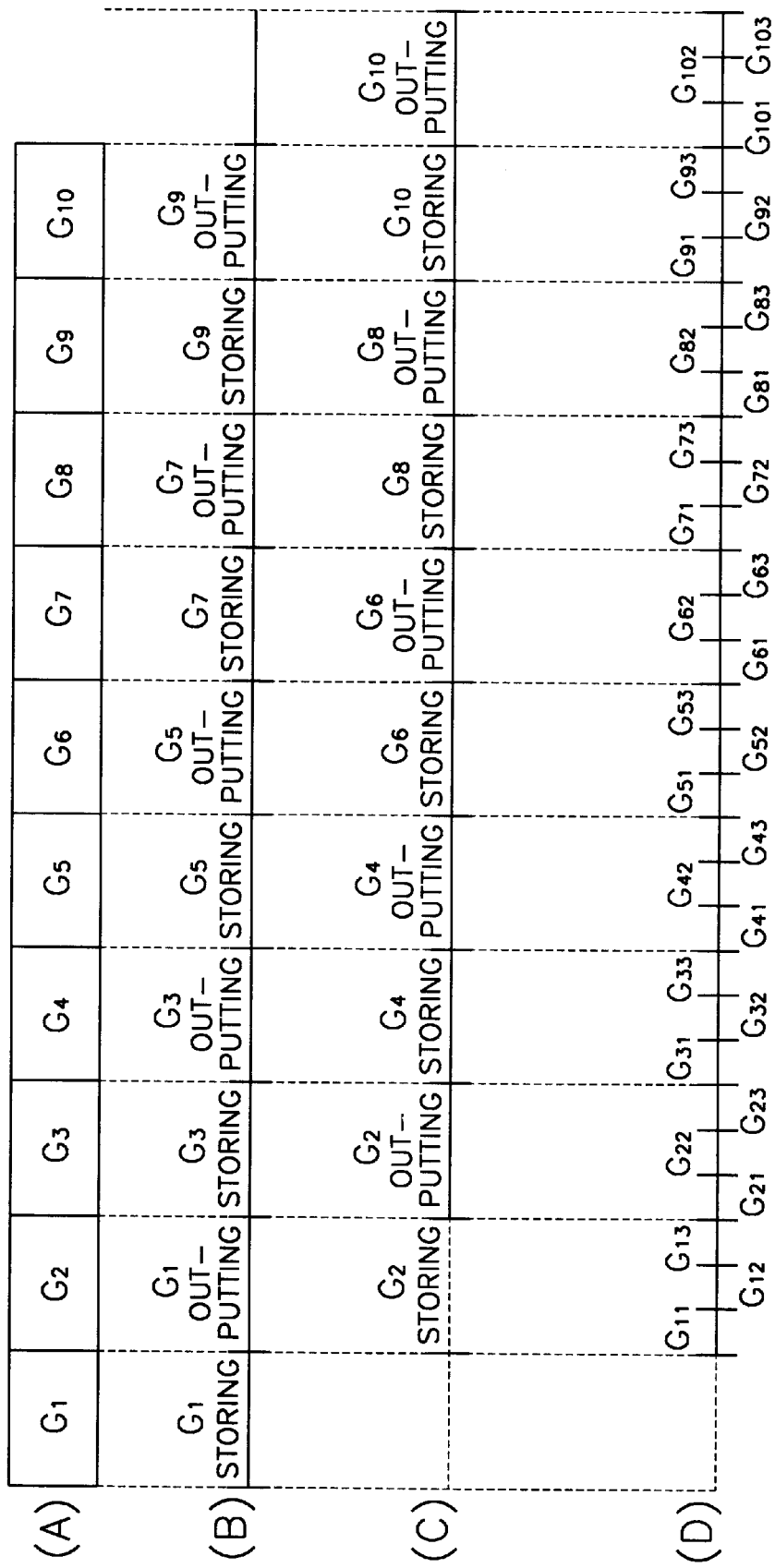
FIG. 10 is a view for illustrating a fifth embodiment of the method for data interfacing according to the present invention.

Comparing a fifth embodiment with the third embodiment, as shown in A of FIG. 10, if the memory section separates 1280 units of data for the upper address electrode corresponding to 1 line into 10 data groups G1–G10 and provides the separated data, as shown in B and C of FIG. 10, the data interfacing section outputs data of the other group which is previously stored while data of one group is stored. Each group data is sequentially outputted as 44 bits of data over 3 times, so that 1280 units of data corresponding to 1 line for the upper address electrode is provided to the electrode driving section over 30 times, totally, as shown in D of FIG. 10.

Address electrode driving section comprises 22 units of driving integrated circuits. Thus, 44 bits of data are alternately loaded into respective 22 units of driving integrated circuits of an odd-numbered sequence and an even-numbered sequence by 3 times, over 5 times. Respective driving integrated circuits comprise a 4-bit input pin and a 60-bit output pin and drive 60 RGB electrodes of the strip-type by inputting the 4 bits of data over 30 times, in total.

Accordingly, in the fifth embodiment, the size of storing area of the data interfacing section can be reduced by half of the first and the third thereof.

Embodiment 6

Figure 11:
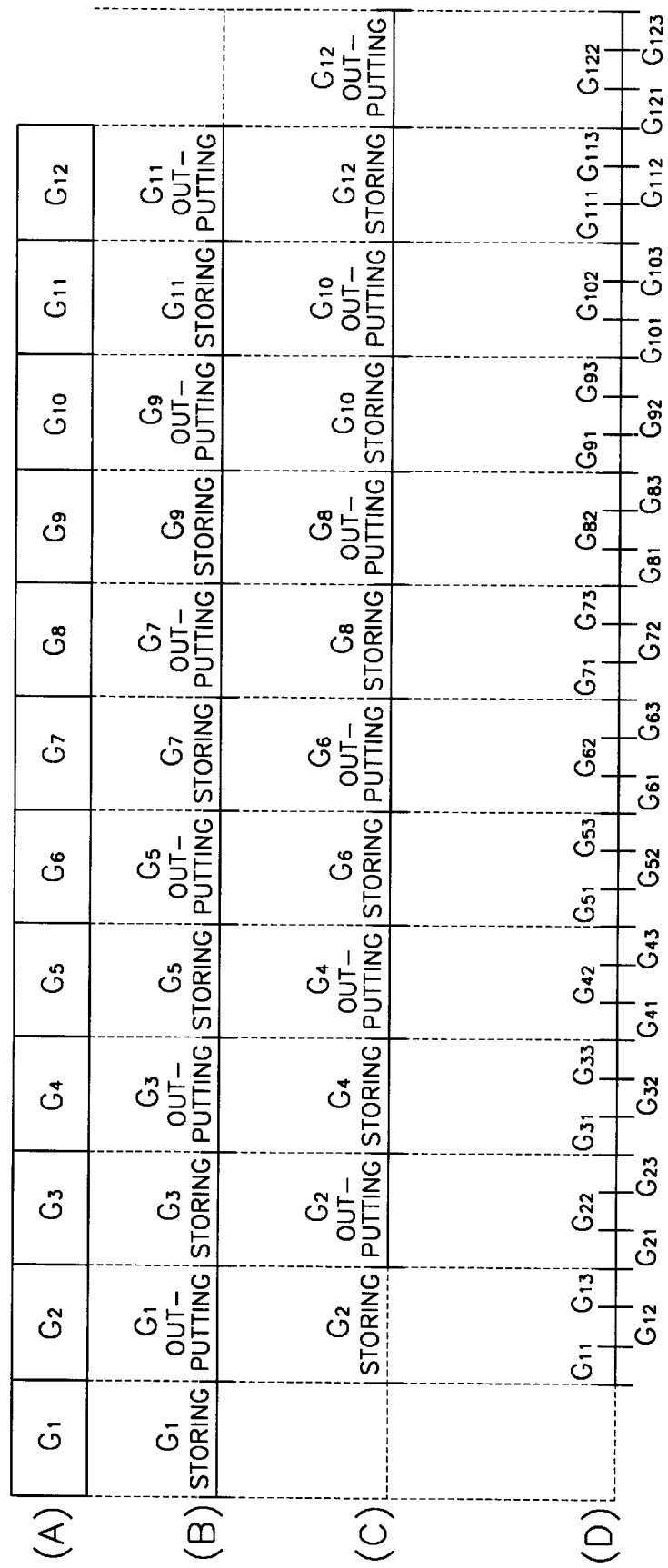
FIG. 11 is a view for illustrating a sixth embodiment of the method for data interfacing according to the present invention.

Comparing a sixth embodiment with the fourth embodiment, as shown in A of FIG. 11, if the memory section separates 1280 units of data for the upper address electrode corresponding to 1 line into 12 data groups G1–G12 and provides the separated data, as shown in B and C of FIG. 11, the data interfacing section outputs data of the other group which is previously stored while data of one group is stored. Each group data is sequentially outputted as 36 bits of data over 3 times, so that 1280 units of data corresponding to 1 line for the upper address electrode is provided to the electrode driving section over 36 times, in total, as shown in D of FIG. 11.

Address electrode driving section comprises 18 units of driving integrated circuits. Thus, 36 bits of data are alternately loaded into respective 18 units of driving integrated circuits of an odd-numbered sequence and an even-numbered sequence by 3 times, over 6 times. Respective driving integrated circuits comprise a 4-bit input pin and a 72-bit output pin and drive 72 RGB electrodes of strip-type by inputting the 4 bits of data over 36 times, in total.

Accordingly, in the sixth embodiment, the size of storing area of the data interfacing section can be reduced by half of the second and the fourth thereof.

As the above described, in the present invention, the size of storing area of the data interfacing section can be reduced by $1/5$, $1/6$, $1/10$ or $1/12$ of the prior thereof. As a result, in the present invention, a circuit design of the data interfacing section is simplified and a number of input pins for external control signal in order to control internal circuit is reduced. Therefore, the ASIC design cost of the data interfacing section can be curtailed and connection efficiency between the data interfacing section and peripheral circuits can be improved, so that the cost price of the PDP-TV can be decreased.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A method for interfacing pixel data from a frame memory whose every line has L (where L≦3N×M; N is a bit number of one word of respective red, green, and blue, M is a minimum integer which is greater than a quotient of S/N, and S is a number of samples of respective red, green and blue per line) units of one-bit pixel data stored therein to Q (where Q is a least integer which is greater than a quotient of L/2P) units of address electrode driving integrated circuits respectively having both N/2 input pins and P (where P is a common multiple of 3 and N/2) output pins, said method comprising the steps of:

repeating, every data corresponding to ½ lines over G times, reading 3N/2-bit red, green and blue data in {A+G(n−1)}-numbered sequence (where A is an initial address value of respective data groups, G is a least integer which is greater than a quotient of M/Q and represents a group number, and 1≦n≦Q) among M units of 3N/2-bit red, green and blue data sequences over Q times in sequence every data corresponding to ½ lines from said frame memory;

storing the read 3N/2-bit red, green and blue data over Q times in a first storage area and, simultaneously, outputting {(N/2)·Q}-bit data sequences over three times from a second storage area having previous data stored therein; and repeating both reading the data from said first storage area and outputting the data from said second storage area alternately over G times.

2. The method for interfacing pixel data as claimed in claim 1, wherein said S, L, M, N, P, Q, and G are 853, 2559, 107, 8, 60, 22, and 5, respectively.

3. The method for interfacing pixel data as claimed in claim 1, wherein said S, L, M, N, P, Q, and G are 853, 2559, 107, 8, 72, 18, and 6, respectively.

4. A flat panel display apparatus having a flat display panel wherein a resolution thereof is 3S×H (where S and H respectively represent a number of samples of respective red, green and blue per line and a number of horizontal scanning lines) and wherein 3S units of red, green and blue strip-shaped address electrodes are alternately arranged to be driven by upper and lower portions of said panel, said apparatus comprising:

a memory for entering N subfield data having L (where L≦3N×M; N is a bit number of one word of respective red, green and blue, and M is a least integer which is greater than a quotient of S/N) units of one-bit pixel data every one line and having H/2 scanning lines in an interlaced scanning system in a first frame memory area, for, simultaneously, repeating, every data corresponding to one line in a sequential scanning system over G times, reading 3N-bit red, green and blue data in {A+G(n−1)}-numbered sequence (where A is an initial address value of respective data groups, G is a least integer which is greater than a quotient of S/Q and represents a group number, and 1≦n≦Q) among M units of 3N-bit red, green and blue data sequences over Q times in sequence every data corresponding to one line from a second memory area having previous N subfield data stored therein;

a data interfacing means, including a pair of data storage sections each for provisionally storing data corresponding to upper and lower driving electrodes, for sequentially storing the read 3N/2-bit red, green and blue data over Q times in a first storage area and, for, simultaneously, outputting {(N/2)·Q}-bit data over three times from a second storage area having previous data stored therein, for alternately repeating both reading the data from said first storage area and outputting the data from said second storage area over G times; and means for sequentially inputting {(N/2)·Q}-bit data from said data interfacing means in parallel over 3G times, and for, in order to drive L/2 address electrodes with the inputted pixel data, driving upper and lower address electrodes, respectively including Q (where Q is a least integer which is greater than a quotient of L/2P) address electrodes driving integrated circuits having both N/2 input pins and P (where P is a common multiple of 3 and N/2) output pins.

5. The flat panel display apparatus as claimed in claim 4, wherein said S, L, M, N, P, Q, and G are 853, 2559, 107, 8, 60, 22, and 5, respectively.

6. The flat panel display apparatus as claimed in claim 4, wherein said S, L, M, N, P, Q, and G are 853, 2559, 107, 8, 72, 18, and 6, respectively.

7. A method for interfacing pixel data from a frame memory whose every line has L (where L≦3N×M; N is a bit number of one word of respective red, green, and blue, M is a minimum integer which is greater than a quotient of S/N, and S is a number of samples of respective red, green and blue per line) units of one-bit pixel data stored therein to Q (where Q is a least integer which is greater than a quotient of L/2P) units of address electrode driving integrated circuits respectively having both N/2 input pins and P (where P is a common multiple of 3 and N/2) output pins, said method comprising the steps of:

repeating, every data corresponding to 1 line over G times, reading 3N/2-bit red, green and blue data in {A+G(n−1)}-numbered sequence (where A is an initial address value of respective data groups, G is a least integer which is greater than a quotient of S/(Q/2) and represents a group number, and 1≦n≦Q/2) among M units of 3N/2-bit red, green and blue data sequences over Q/2 times in sequence every data corresponding to 1 lines from said frame memory;

storing the read 3N/2-bit red, green and blue data over Q/2 times in a first and a second storage areas and, simultaneously, outputting {(N/2)·(Q/2)}-bit data sequences over 6 times from a third and a fourth storage areas having previous data stored therein; and repeating both reading the data from said first and said second storage areas and outputting the data from said third and said fourth storage areas alternately over G/2 times.

8. The method for interfacing data as claimed in claim 7, wherein said S, L, M, N, P, Q, and G are 853, 2559, 107, 8, 60, 22, and 10, respectively.

9. The method for interfacing data as claimed in claim 7, wherein said S, L, M, N, P, Q, and G are 853, 2559, 107, 8, 72, 18, and 12, respectively.

10. A flat panel display apparatus having a flat display panel wherein a resolution thereof is 3S×H (where S and H respectively represent a number of samples of respective red, green and blue per line and a number of horizontal scanning lines) and wherein 3S units of red, green and blue strip-shaped address electrodes are alternately arranged to be driven by upper and lower portions of said panel, said apparatus comprising:

a memory for entering N subfield data having L (where L≦3N×M; N is a bit number of one word of respective red, green and blue, and M is a least integer which is greater than a quotient of S/N) units of one-bit pixel data every line and having H/2 scanning lines in an interlaced scanning system in a first frame memory area, for, simultaneously, repeating, every data corresponding to one line in a sequential scanning system over G times, reading 3N-bit red, green and blue data in {A+G(n−1)}-numbered sequence (where A is an initial address value of respective data groups, G is a least integer which is greater than a quotient of S/Q and represents a group number, and 1≦n≦Q/2) among M units of 3N-bit red, green and blue data sequences over Q times in sequence every data corresponding to one line from a second memory area having previous N subfield data stored therein;

a data interfacing means, including a pair of data storage sections each for provisionally storing data corresponding to upper and lower driving electrodes, for sequentially storing the read 3N/2-bit red, green and blue data over Q/2 times in a first and a second storage area, for, simultaneously, outputting {(N/2)·(Q/2)}-bit data over 6 times from a third and a fourth storage areas having previous data stored therein, and for alternately repeating both reading the data from said first and said second storage areas and outputting the data from said third and said fourth storage areas over G/2 times; and means for, sequentially and alternately, inputting {(N/2)·(Q/2)}-bit data from said data interfacing means in parallel over 3×(G/2) times into integrated circuits of an odd-numbered sequence and of an even-numbered sequence, and for, in order to drive L/2 address electrodes with the inputted pixel data, driving upper and lower address electrodes, respectively including Q (where Q is a least integer which is greater than a quotient of L/2P) address electrodes driving integrated circuits having both N/2 input pins and P (where P is a common multiple of 3 and N/2) output pins.

11. The flat panel display apparatus as claimed in claim 10, wherein said S, L, M, N, P, Q, and G are 853, 2559, 107, 8, 60, 22, and 5, respectively.

12. The flat panel display apparatus as claimed in claim 10, wherein said S, L, M, N, P, Q, and G are 853, 2559, 107, 8, 72, 18, and 6, respectively.

13. A method for interfacing pixel data from a frame memory whose every line has L (where L≦3N×M; N is a bit number of one word of respective red, green, and blue, M is a minimum integer which is greater than a quotient of S/N, and S is a number of samples of respective red, green and blue per line) units of one-bit pixel data stored therein to Q (where Q is a least integer which is greater than a quotient of L/2P) units of address electrode driving integrated circuits respectively having both N/2 input pins and P (where P is a common multiple of 3 and N/2) output pins, said method comprising the steps of:

repeating, every data corresponding to 1 line over G times, reading 3N/2-bit red, green and blue data in {A+G(n−1)}-numbered sequence (where A is an initial address value of respective data groups, G is a least integer which is greater than a quotient of M/Q and represents a group number, and $1 \leq n \leq Q/2$) among M units of 3N/2-bit red, green and blue data sequences over Q/2 times in sequence every data corresponding to 1 line from said frame memory; storing the read 3N/2-bit red, green and blue data over Q/2 times in a first storage area and, simultaneously, outputting {(N/2)·(Q/2)}-bit data sequences over 3 times from a second storage area having previous data stored therein; and repeating both reading the data from said first storage area and outputting the data from said second storage area alternately over G times.

14. The method for interfacing data as claimed in claim 13, wherein said S, L, M, N, P, Q, and G are 853, 2559, 107, 8, 60, 22, and 10, respectively.

15. The method for interfacing data as claimed in claim 13, wherein said S, L, M, N, P, Q, and G are 853, 2559, 107, 8, 72, 18, and 12, respectively.

16. A flat panel display apparatus having a flat display panel wherein a resolution thereof is 3S×H (where S and H respectively represent a number of samples of respective red, green and blue per line and a number of horizontal scanning lines) and wherein 3S units of red, green and blue strip-shaped address electrodes are alternately arranged to be driven by upper and lower portions of said panel, said apparatus comprising:

a memory for entering N subfield data having L (where $L \leq 3N \times M$; N is a bit number of one word of respective red, green and blue, and M is a least integer which is greater than a quotient of S/N) units of one-bit pixel data every one line and having H/2 scanning lines in an interlaced scanning system in a first frame memory area, and for, simultaneously, repeating, every data corresponding to one line in a sequential scanning system over G times, reading 3N-bit red, green and blue data in {A+G(n−1)}-numbered sequence (where A is an initial address value of respective data groups, G is a least integer which is greater than a quotient of S/Q and represents a group number, and $1 \leq n \leq Q/2$) among M units of 3N-bit red, green and blue data sequences over Q times in sequence every data corresponding to one line from a second memory area having previous N subfield data stored therein;

a data interfacing means, including a pair of data storage sections each for provisionally storing data corresponding to upper and lower driving electrodes, for sequentially storing the read 3N/2-bit red, green and blue data over Q/2 times in a first storage area, for, simultaneously, outputting {(N/2)·(Q/2)}-bit data over 3 times from a second storage area having previous data stored therein, and for alternately repeating both reading the data from said first storage area and outputting the data from said second storage area over G times; and means for, sequentially and alternately, inputting {(N/2)·(Q/2)}-bit data from said data interfacing means by serial 3 times in parallel over G times into integrated circuits of an odd-numbered sequence and of even-numbered sequence, and for, in order to drive L/2 address electrodes with the inputted pixel data, driving upper and lower address electrodes, respectively including Q (where Q is a least integer which is greater than a quotient of L/2P) address electrodes driving integrated circuits having both N/2 input pins and P (where P is a common multiple of 3 and N/2) output pins.

17. The flat panel display apparatus as claimed in claim 16, wherein said S, L, M, N, P, Q, and G are 853, 2559, 107, 8, 60, 22, and 5, respectively.

18. The flat panel display apparatus as claimed in claim 16, wherein said S, L, M, N, P, Q, and G are 853, 2559, 107, 8, 72, 18, and 6, respectively.

* * * * *